(12) United States Patent
Diaz-Aunon

(10) Patent No.: US 12,478,947 B2
(45) Date of Patent: Nov. 25, 2025

(54) CHROMATOGRAPHIC MEDIA AND METHODS OF MAKING AND USING SAME

(71) Applicant: Immutrix Therapeutics, Inc., Rapid City, SD (US)

(72) Inventor: Jose A. Diaz-Aunon, Rapid City, SD (US)

(73) Assignee: Immnutrix Therapeutics, Inc., Rapid City, SD (US)

( * ) Notice: Subject to any disclaimer, the term of this patent is extended or adjusted under 35 U.S.C. 154(b) by 1038 days.

(21) Appl. No.: 17/613,588

(22) PCT Filed: May 22, 2020

(86) PCT No.: PCT/US2020/034285
§ 371 (c)(1),
(2) Date: Nov. 23, 2021

(87) PCT Pub. No.: WO2020/242969
PCT Pub. Date: Dec. 3, 2020

(65) Prior Publication Data
US 2022/0234023 A1 Jul. 28, 2022

Related U.S. Application Data

(60) Provisional application No. 62/852,760, filed on May 24, 2019.

(51) Int. Cl.
| | |
|---|---|
| *B01J 20/20* | (2006.01) |
| *B01D 15/16* | (2006.01) |
| *B01D 15/32* | (2006.01) |
| *B01J 20/28* | (2006.01) |
| *B01J 20/282* | (2006.01) |
| *C07C 37/82* | (2006.01) |
| *C07C 51/47* | (2006.01) |
| *C07D 307/91* | (2006.01) |
| *C07D 311/80* | (2006.01) |
| *C07D 311/94* | (2006.01) |

(52) U.S. Cl.
CPC ............ *B01J 20/20* (2013.01); *B01D 15/165* (2013.01); *B01D 15/322* (2013.01); *B01D 15/325* (2013.01); *B01J 20/28064* (2013.01); *B01J 20/28066* (2013.01); *B01J 20/28085* (2013.01); *B01J 20/282* (2013.01); *C07C 37/82* (2013.01); *C07C 51/47* (2013.01); *C07D 307/91* (2013.01); *C07D 311/80* (2013.01); *C07D 311/94* (2013.01); *B01J 2220/52* (2013.01)

(58) Field of Classification Search
CPC .............................. B01J 20/20; C01B 32/384
See application file for complete search history.

(56) References Cited

U.S. PATENT DOCUMENTS

| | | | | |
|---|---|---|---|---|
| 4,029,600 | A | * | 6/1977 | Schmitt, Jr. ............ C13B 20/123 502/438 |
| 5,726,118 | A | * | 3/1998 | Ivey ........................ C01B 32/30 502/437 |
| 2007/0258879 | A1 | * | 11/2007 | Karles ................ B01J 20/28083 423/445 R |
| 2015/0297821 | A1 | | 10/2015 | Rae et al. |
| 2019/0010106 | A1 | | 1/2019 | Oroskar et al. |

FOREIGN PATENT DOCUMENTS

| | | |
|---|---|---|
| EP | 0334641 A2 | 9/1989 |
| EP | 3151862 B1 | 4/2017 |
| WO | 2016049483 A1 | 3/2016 |

OTHER PUBLICATIONS

Korean Intellectual Property Office, PCT/US2020/034285, International Search Report, Sep. 4, 2020, 3 pages.
Korean Intellectual Property Office, PCT/US2020/034285, Written Opinion, Sep. 4, 2020, 7 pages.
Korean Intellectual Property Office, PCT/US2020/034285, International Preliminary Report on Patentability, Nov. 16, 2021, 8 pages.

* cited by examiner

*Primary Examiner* — Stuart L Hendrickson
(74) *Attorney, Agent, or Firm* — Barnes & Thornburg LLP; Jerry C. Harris, Jr.

(57) ABSTRACT

Tailored chromatographic media and methods for using the tailored chromatographic media to purify mixtures extracted from cannabis to obtain a cannabinoid having greater than about 90% purity. In an embodiment, the tailored chromatographic media may comprise a porous resin and/or porous carbon and have a surface area of greater than about 900 m2/g, wherein the tailored chromatographic media may further comprise micropores, mesopores, macropores, wherein the tailored chromatographic media may further comprise at least two distributions of macroporous pore sizes, wherein the at least two distributions of macroporous pore sizes may comprise a first population having a macroporous pore size denoted x and a second population having a macroporous pore size denoted y, wherein a ratio of x/y may be about 1:1, and wherein the tailored chromatographic media may further comprise an anionic polysaccharide and a functional moiety.

3 Claims, 1 Drawing Sheet

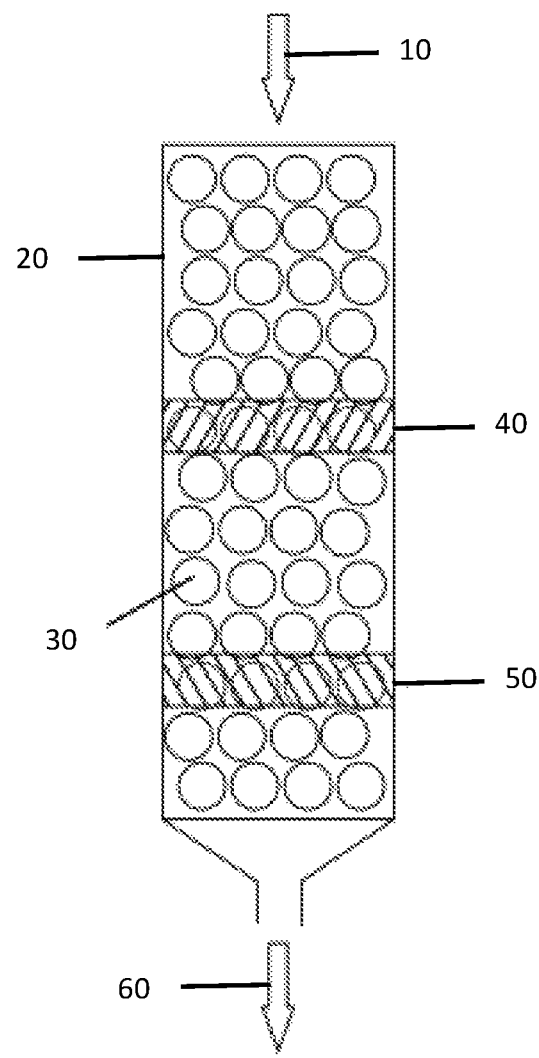

CHROMATOGRAPHIC MEDIA AND METHODS OF MAKING AND USING SAME

CROSS-REFERENCE TO RELATED APPLICATIONS

This present application is a U.S. nationalization 35 U.S.C. § 371 in International Application No. PCT/US2020/034285, filed May 22, 2020, which claims priority to U.S. provisional Application Ser. No. 62/852,760, filed May 24, 2019, and entitled "Chromatographic Media and Methods of Making and Using Same." The disclosures set forth in the referenced applications are incorporated by reference herein in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Chromatography is one of the most frequently used technique for the separation and purification of compounds. The fundamentals of chromatography involve dissolution of a mixture for separation into a mobile phase which is contacted with a stationary phase. Separation is based on partitioning of the mixture between the mobile and stationary phase. The forces that govern partitioning range vary (e.g., size, charge) and are used to categorize the different types of chromatography.

An ongoing need exists for novel compositions to function as chromatographic matrices capable of facilitating the separation of compounds.

TECHNICAL FIELD

Generally disclosed herein are compositions for use as chromatographic media. More particularly disclosed herein are compositions for use as chromatographic media and methods of using same.

SUMMARY

In some embodiments is described a tailored chromatographic media comprising a porous resin having a surface area of greater than about 900 m2/g, wherein the tailored chromatographic media further comprises micropores, mesopores, macropores, or combinations thereof, wherein the tailored chromatographic media further comprises beads having a particle size from about 10 μm to about 1000 μm, wherein the beads comprise macropores comprising a pore size of about 75 μm to about 1000 μm, wherein the tailored chromatographic media further comprises at least two distributions of macroporous pore sizes, wherein the at least two distributions of macroporous pore sizes comprise a first population having a macroporous pore size denoted x and a second population having a macroporous pore size denoted y, wherein a ratio of x/y is about 1:1, and wherein the tailored chromatographic media further comprises an anionic polysaccharide and a functional moiety.

In some embodiments is described a tailored chromatographic media comprising a porous carbon having a surface area of greater than about 900 m2/g, wherein the tailored chromatographic media further comprises micropores, mesopores, macropores, or combinations thereof, wherein the tailored chromatographic media further comprises beads having a particle size from about 10 μm to about 1000 μm, wherein the beads comprise macropores comprising a pore size of about 75 μm to about 1000 μm, wherein the tailored chromatographic media further comprises at least two distributions of macroporous pore sizes, wherein the at least two distributions of macroporous pore sizes comprise a first population having a macroporous pore size denoted x and a second population having a macroporous pore size denoted y, wherein a ratio of x/y is about 1:1, and wherein the tailored chromatographic media further comprises an anionic polysaccharide and a functional moiety.

In some embodiments is described a method of comprising subjecting a mixture extracted from cannabis to chromatography using a tailored chromatographic media comprising a porous resin having a surface area of greater than about 900 m2/g to obtain a cannabinoid having greater than about 90% purity.

BRIEF DESCRIPTION OF THE DRAWING

FIG. 1 is a depiction of a chromatographic column.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field (for example, ±10%); and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Disclosed herein are materials for use as chromatographic media. In an aspect, the chromatographic media is used as a stationary phase in a chromatographic separation. In another aspect, the chromatographic media is modified to include specific functionalities or entities that specifically bind one or more target molecules. In such aspects, the chromatographic media may be used in the performance of affinity chromatography. In other aspects, the chromatographic media of this disclosure is used as the stationary phase in normal phase chromatography. Alternatively, the chromatographic media of this disclosure is used as the stationary phase in reverse phase chromatography, alternatively reverse phase flash chromatography. Herein the compositions for use as chromatographic media are termed tailored chromatographic media and designated TCM.

As shown in FIG. 1, a mixture which is dissolved in a mobile phase 10 is introduced into a column 20. The column 20 comprises a stationary phase which comprises the TCM 30. As the mobile phase 10 passes through the TCM 30, parts of the mixture are separated based on the speed at which the components of the mixture pass through the TCM 30, e.g., slower moving component 40 does not interact with the TCM 30 in the same fashion as faster moving component 50. As the slower moving component 40 and the faster moving component 50 exit the column, they can be collected as an analyte 60.

In an aspect, the TCMs of the present disclosure comprise resins containing micro-, meso- and macropores. A resin for use as a TCM of the type disclosed herein may be prepared using any suitable methodology. Alternatively, the synthetic resin is prepared using a phenolic resin. As used herein, the term "micropore" refers to pores with diameter <2 nm, as measured by nitrogen adsorption and mercury porosimetry methods and as defined by IUPAC. As used herein, the term "mesopore" refers to pores with diameter from ca. 2 nm to ca. 50 nm, as measured by nitrogen adsorption and mercury porosimetry methods and as defined by IUPAC. As used herein, the term "macropore" refers to pores with diameters larger than 50 nm, as measured by nitrogen adsorption and mercury porosimetry methods and as defined by IUPAC. In relation to this disclosure there are two types of macropores. In macroporous beads they are located within beads and formed by pore-formers. Their size is 50-500 nm, typically 70-200 nm. These macropores are very effective in adsorption of cytokines.

Herein a mesoporous resin may be formed by condensing a nucleophilic component which comprises a phenolic compound or a phenol condensation prepolymer with at least one electrophilic cross-linking agent selected from formaldehyde, paraformaldehyde, furfural and hexamethylene tetramine in the presence of a pore-former selected from the group consisting of a diol (e.g., ethylene glycol), a diol ether, a cyclic ester, a substituted cyclic ester, a substituted linear amide, a substituted cyclic amide, an amino alcohol and a mixture of any of the above with water to form a resin. The pore-former is present in an amount effective to impart meso- or macroporosity to the resin (e.g., at least 120 pbw of the pore former being used to dissolve 100 pbw of the total resin forming components (i.e., the nucleophilic component plus electrophilic component)), and it is removed from the porous resin after condensation by cascade washing with water or by vacuum drying. The resulting resin may be carbonized by heating in an inert atmosphere to a temperature of at least 600° C. to give a material having a bimodal distribution of pores, the pore structure as estimated by nitrogen adsorption porosimetry comprising micropores and mesopores or macropores. The value for the differential of pore volume with respect to the logarithm of pore radius (dV/d log R) for the mesopores is greater than 0.2 for at least some values of pore size in the range 20-500 Å. The mesoporous carbon may have a BET surface area of 250-800 $m^2/g$ without activation. It may be activated by heating it at high temperature in the presence of carbon dioxide, steam or a mixture thereof, e.g. by heating it in carbon dioxide at above 800° C., or it may be activated by heating it in air at above 400° C. It may then have surface areas of up to 2000 $m^2/g$ and even higher e.g. 1000-2000 $m^2/g$. As used herein the term "BET surface area" is determined by the Brunauer, Emmett, and Teller (BET) method according to ASTM D1993-91, see also ASTM D6556-04.

In an aspect, the nucleophilic component may comprise a phenolic Novolac resin (i.e., Novolac) or other similar oligomeric starting material, which is partially polymerized and confers less exothermicity and hence more controllability during the polymerization reaction to the desired resin. In another aspect, Novolac may be characterized by AMW in the range of from 300 to 3000 prior to cross-linking (corresponding to a DP with respect to phenol of about 3-30). Where Novolacs are used, they may be solids with melting points in the region of 100° C. Novolacs of AMW less than 2000, alternatively less than 1500, tend to require lower amounts of pore former to produce resins comprising carbons with desired post-carbonization pore size distributions. Novolacs are thermally stable in that they can be heated so that they become molten and cooled so that they solidify repeatedly without structural change. They are cured on addition of cross-linking agents and heating. Fully cured resins are infusible and insoluble. Whilst commercial Novolacs are largely produced using phenol and formaldehyde, a variety of modifying reagents can be used at the pre-polymer formation stage to introduce a range of different oxygen and nitrogen functionalities and cross-linking sites.

In a non-limiting aspect, modifying reagents may comprise dihydric phenols (e.g., resorcinol or hydroquinone), or nitrogen containing compounds. Both resorcinol and hydroquinone are more reactive than phenol and can lead to some cross-linking at the pre-polymer production stage. Both resorcinol and hydroquinone may be introduced at the cross-linking stage to provide different cross-linking paths. Both resorcinol and hydroquinone also increase the oxygen functionality of the resins. Nitrogen containing compounds that are active in polycondensation reactions include urea, aromatic amines (e.g., aniline or m-amino phenol) and heteroaromatic amines (e.g., melamine). Nitrogen containing compounds facilitate introduction of specific types of nitrogen functionality into the initial polymer and the final carbon and, likewise, influence the development of the mesoporous structure of both the resins and the final carbons. Hydroquinone, resorcinol, and the nitrogen containing nucleophilic modifying reagents possess two or more active sites and are more reactive in condensation reactions than phenol or Novolacs. Consequently, these compounds will react with primary cross-linking agents faster than either phenol or Novolacs resulting in in situ formation of secondary cross-linking agents that can react with phenol or Novolacs.

The nucleophilic component may be provided alone or in association with a polymerization catalyst which may be a weak organic acid miscible with the Novolac and/or soluble in the pore former (e.g., salicylic acid, oxalic acid or phthalic acid). The concentration of Novolac in the pore former may be such that when combined with the solution of cross-linking agent in the same pore former the overall ratio of pore former to (Novolac+cross-linking agent) is at least 125:100 by weight. The actual ratios of Novolac:pore former and cross-linking agent:pore former are set according to convenience in operation by the operational requirements of a bead production plant and are controlled by the viscosity of the Novolac:pore former solution such that it remains pumpable and by the ratio of cross-linking agent:pore former such that the cross-linking agent remains in solution throughout the plant.

In an aspect, the cross-linking agent is normally used in an amount of from about 5 pbw to about 40 pbw per 100 pbw of the nucleophilic components (e.g., Novolac). In another aspect, the cross-linking agent may comprise an aldehyde (e.g., formaldehyde or furfural), hexamethylenetetramine (i.e., hexamine), or hydroxymethylated melamine. Alternatively, the cross-linking agent is hexamine and in aspects requiring a completely cured resin the cross-linking agent is present at about 10 pbw to about 25 pbw hexamine or, alternatively about 15 pbw to about 20 pbw hexamine to 100 pbw of Novolac. In some aspects, application of the hexamine-to-Novolac ratio stated above ensures formation of the solid resin with maximal cross-linking degree and ensures the stability of the mesopore structure during subsequent removal of the pore former.

The pore former also acts as solvent. Thus, the pore former is used in quantities sufficient to dissolve the components of the resin system, wherein the weight ratio of pore former to the total components of the resin system resin is at least 1.25:1. The pore former may be, for example, a diol, a diol-ether, a cyclic ester, a substituted cyclic or linear amide or an amino alcohol, e.g. ethylene glycol, 1,4-butylene glycol, diethylene glycol, triethylene glycol, γ-butyrolactone, propylene carbonate, dimethylformamide, N-methyl-2-pyrrolidinone and monoethanolamine, ethylene glycol being preferred, and where the selection is also limited by the thermal properties of the solvent as it should not boil or have an excessive vapor pressure at the temperatures used in the curing process.

It is thought that the mechanism of meso- and macropore generation is due to a phase separation process that occurs during the cross-linking reaction. In the absence of a pore former, as the linear chains of pre-polymer undergo cross-linking, their molecular weight initially increases. Residual low molecular weight components become insoluble in the higher molecular weight regions causing a phase separation into cross-linked high molecular weight domains within the lower molecular weight continuous phase. Further condensation of light components to the outside of the growing domains occurs until the cross-linked phase becomes essentially continuous with residual lighter pre-polymer trapped between the domains. In the presence of a low level of pore former (e.g., <120 parts/100 parts Novolac for the Novolac-Hexamine-Ethylene Glycol reaction system), the pore former is compatible with the cross-linked resin domains. Most the pore former remains within the cross-linked resin domains and the remainder of the pore former forms a solution with the partially cross-linked polymer between the domains. In the presence of higher levels of pore former, which exceed the capacity of the cross-linked resin, the pore former adds to the light polymer fraction increasing the volume of material in the voids between the domains that gives rise to the mesoporosity and/or macroporosity. In general, the higher the pore former content, the wider the mesopores, up to macropores, and the higher the pore volume.

This phase separation mechanism provides a variety of ways of controlling the pore development in the cross-linked resin structures. These include chemical composition and concentration of the pore former; chemical composition and quantity of the cross-linking electrophilic agents, presence, chemical nature and concentration of modifying nucleophilic agents, chemical composition of phenolic nucleophilic components (e.g., phenol or Novolac), the presence of water within the solvent and concentration of any curing catalyst if present. In an exemplary method for the formation of a synthetic carbon particle a precursor resin formulation is used which comprises a large proportion of pore former (e.g., 250 parts ethylene glycol or other pore former to 100 parts of resin-forming components).

A resin particle suitable for use in the present disclosure may have any shape compatible with the compositions and methodologies disclosed herein. For example, the shape of the resin particle may be that of an irregular granule, a low angularity shape, spherical (e.g., bead), pellet, minilith, monolith, etc. The resin may be formed using any suitable methodology to results in a material having the properties disclosed herein.

In an aspect, the resin is formed into a bead. In such aspects, the bead form may be prepared by pouring a solution of a partially cross-linked pre-polymer into a hot liquid such as mineral oil containing a dispersing agent followed by stirring the mixture. The pre-polymer solution transitions into bead forms which are initially liquid and become solid as curing proceeds. The average bead particle size is controlled by several process parameters including the stirrer type and speed, the oil temperature and viscosity, the pre-polymer solution viscosity and volume ratio of the solution to the oil and the mean size can be adjusted between 5 and 2000 μm. The beads can then be filtered off from the oil. In a preparative example, industrial Novolac resin is mixed with ethylene glycol at an elevated temperature, mixed with hexamine and heated to give a viscous solution which is poured into mineral oil containing a drying oil, after which the mixture is further heated to effect curing. On completion of curing, the reaction mixture is cooled, after which the resulting porous resin is filtered off, and washed with hot water to remove pore former and a small amount of low molecular weight polymer.

In some aspects beads of the present disclosure can be produced with a narrow particle size distribution, wherein D90.D10 is better than 10, alternatively better than 5. However, the bead size distribution that can be achieved in practice in stirred tank reactors is relatively wide, and the more the process is scaled up the worse the homogeneity of the mixing regime and hence the particle size distribution becomes wider.

Discrete solid beads of polymeric material e.g. phenolic resin having a porous structure may be formed, which process may produce resin beads on an industrial scale without aggregates of resin building up speedily and interrupting production. The process comprises the steps of: (a) combining a stream of a polymerizable liquid precursor e.g. a Novolac and hexamine as cross-linking agent dissolved in a first polar organic liquid e.g. ethylene glycol with a stream of a liquid suspension medium which is a second non-polar organic liquid with which the liquid precursor is substantially or completely immiscible e.g. transformer oil containing a drying oil; (b) mixing the combined stream to disperse the polymerizable liquid precursor as droplets in the suspension medium e.g. using an in-line static mixer; (c) allowing the droplets to polymerize in a laminar flow of the suspension medium so as to form discrete solid beads that cannot agglomerate; and (d) recovering the beads from the suspension medium.

For bead production, the pore former comprises a polar organic liquid e.g. ethylene glycol chosen in combination with dispersion medium which is a non-polar organic liquid so as to form a mainly or wholly immiscible combination, the greater the incompatibility between the pore former which forms the dispersed phase and the dispersion medium, the less pore former becomes extracted into the dispersion medium. The pore former desirably has a greater density than the dispersion medium with which it is intended to be used so that droplets of the pore former containing dissolved resin-forming components will pass down a column more rapidly than a descending flow of dispersion medium therein. Both protic and aprotic solvents of different classes of organic compounds match these requirements and can be used as pore formers, both individually and in mixtures. In addition to dissolving the reactive components and any catalyst, the pore former should also, in the case of phenolic resins, be compatible with water and/or other minor condensation products (e.g., ammonia) which are formed by elimination as polymerization proceeds, and the pore former is preferably highly miscible with water so that it can be readily removed from the polymerized resin beads by washing.

The dispersion medium is a liquid which can be heated to the temperature at which curing is carried out (e.g., to 160° C.) without boiling at ambient pressure and without decomposition and which is immiscible with ethylene glycol and with the dissolved components therein. It may be hydrocarbon-based transformer oil which is a refined mineral oil and is a by-product of the distillation of petroleum. It may be composed principally of $C_{15}$-$C_{40}$ alkanes and cycloalkanes, have a density of 0.8-0.9 depending upon grade and have a boiling point at ambient pressure of 260-330° C., also depending upon grade. Transformer oil has a viscosity of about 0.5 poise at 150° C. which is a typical cure temperature. Transformer oil or other dispersion medium may be used in volumes 3-10 times the volume of the combined streams of nucleophilic precursor and crosslinking agent e.g. about 5 times.

Preferred dispersing agents which are dissolved in the dispersion medium before that medium is contacted with the reaction mixture to be dispersed therein to retard droplet coalescence are either sold as drying oils e.g. Danish oil or are produced by partially oxidizing naturally occurring precursors such as tung oil, linseed oil etc. The dispersing agents are consumed as the process proceeds, so that if the dispersion medium is recycled, dispersing agent in the recycled oil stream should be replenished. The dispersing agent is conveniently supplied as a stream in solution in the dispersion medium e.g. transformer oil and e.g. in an amount of 5-10% v/v where Danish oil is used which contains a low concentration of the active component to give final concentration of the dispersant in the dispersion medium 0.2-1% v/v. Higher dispersant concentrations would be used in the case of oxidized vegetable oils. The composition at this point, for example a resin formed into a bead, is a TCM.

In some aspects, the compositions may be further processed. For example, the resin beads formed as described above may be carbonized and optionally activated. For example, carbonization and activation may comprise supplying the material to an externally fired rotary kiln maintained at carbonizing and activating temperatures, the kiln having a downward slope to progress the material as it rotates, the kiln having an atmosphere substantially free of oxygen provided by a counter-current of steam or carbon dioxide, and annular weirs being provided at intervals along the kiln to control progress of the material. In an aspect, a synthetic carbon particle suitable for use in the present disclosure is characterized by a microporous/macroporous structure.

In an aspect, the TCM has a macroporous pore size of from about 75 μm to about 1000 inn, alternatively the TCM has a macroporous size of from about 100 μm to about 750 μm, or alternatively from about 100 μm to about 500 μm. Herein a TCM suitable for use in the present disclosure may comprise a TCM having at least two pore size distribution such that the TCM comprises at least two distributions of macroporous pore sizes. In an aspect, the TCM may comprise a first population having a macroporous pore size denoted x and a second population having a macroporous pore size denoted y where the TCM provides a mixture having a ratio of x/y of about 1:1; alternatively about 5:1, alternatively about 10:1, alternatively about 20:1; alternatively about 50:1, or alternatively about 100:1. In some aspects, the TCM comprises a mixture of two populations wherein the pore size of the first population is approximately twice the pore size of the second population. In some aspects, the TCM comprises a mixture of three populations where the pore size of a first population is approximately twice the pore size of the second population and the pore size of the third population is approximately two and a half times the pore size of the second population.

It is contemplated that the TCM will be formed into beads having a particle size appropriate for the chromatographic separation intended. In an aspect, the TCM is formed into beads having a particle size of from about 10 microns to about 1000 microns, alternatively from about 50 microns to about 500 microns or alternatively from about 100 microns to about 250 microns.

The present disclosure contemplates the use of a porous solid matrix comprising any of the materials disclosed herein and having a surface area of greater than about 900 $m^2$/g; alternatively greater than about 1200 $m^2$/g or alternatively greater than about 1500 $m^2$/g as a TCM.

In some aspects the TCM comprises a resin of the type disclosed herein and is used as the stationary phase in reverse phase chromatography, alternatively reverse phase flash chromatography.

In some aspects the TCM comprises an activated carbon material of the type disclosed herein and is used as the stationary phase in normal phase chromatography.

In some aspects, the TCM further comprises an anionic polysaccharide which coats a resin or carbon material of the type disclosed herein. Any anionic polysaccharide compatible with the intended applications may be employed. For example and without limitation the anionic polysaccharide comprises dextran, cellulose, pectin, alginate or combinations thereof. In such aspects the TCM may be further functionalized to include functional moieties that selectively bind molecules found in the mixture to be separated.

In one aspect, the TCM is functionalized so as to provide a chromatographic media that (i) separates and/or purifies a mixture and (ii) chemically modifies at least one molecule in the mixture. For example, the TCM may contain oxidizing functionalities that when contacted with at least one molecule under the conditions employed for separation results in the oxidation of that at least one molecule.

As will be understood by one ordinary skill in the art, solid-liquid chromatographic separations of the type disclosed herein employ a solvent system. In an aspect, any solvent system compatible with the TCMs disclosed herein and intended application may be employed.

In an exemplary aspect, a mixture comprising cannabinoids extracted from a species of *Cannabis* plant is separated and/or purified utilizing a TCM of the present disclosure. In an exemplary aspect, a mixture comprising cannabinoids extracted from a Hemp plant is separated and/or purified utilizing a TCM of the present disclosure. Such separations may provide a single cannabinoid having a purity of greater than about 90%, alternatively greater than about 95%, alternatively greater than about 99% or alternatively greater than about 99.5% where the single cannabinoid may be a cannabichromene, a cannabicyclol, a cannabidiol, a cannabielsoin, a cannabigerol, a cannabinol, a cannabinodiol, a cannabitriol, a delta-8-tetrahydrocannabinol, a delta-9-tetrahydrocannabinol or combinations thereof. In an aspect, a method of the present disclosure comprises separation of a mixture of cannabinoids utilizing the TCMs disclosed herein to produce a solution comprising greater than about 90% of a compound selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD, cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

Having described various devices and methods herein, exemplary embodiments or aspects can include, but are not limited to the following embodiments numbered 1-186:

1. A tailored chromatographic media comprising a porous carbon, a porous resin, an anionic polysaccharide, a functional moiety, a bead, a granule, a pellet, a minilith, a monolith, or combinations thereof.

2. The tailored chromatographic media of embodiment 1 having a surface area of greater than about 900 m²/g.

3. The tailored chromatographic media of embodiment 2 having a surface area of greater than about 1500 m²/g.

4. The tailored chromatographic media of embodiment 1, wherein the bead has a particle size from about 10 μm to about 1000 μm.

5. The tailored chromatographic media of embodiment 2, wherein the bead has a particle size from about 50 μm to about 500 μm.

6. The tailored chromatographic media of embodiment 3, wherein the bead has a particle size from about 100 μm to about 250 μm.

7. The tailored chromatographic media of embodiment 1, wherein the tailored chromatographic media further comprises micropores, mesopores, macropores, or combinations thereof.

8. The tailored chromatographic media of embodiment 2, wherein the tailored chromatographic media further comprises micropores, mesopores, macropores, or combinations thereof.

9. The tailored chromatographic media of embodiment 3, wherein the tailored chromatographic media further comprises micropores, mesopores, macropores, or combinations thereof.

10. The tailored chromatographic media of embodiment 4, wherein the tailored chromatographic media further comprises micropores, mesopores, macropores, or combinations thereof.

11. The tailored chromatographic media of embodiment 5, wherein the tailored chromatographic media further comprises micropores, mesopores, macropores, or combinations thereof.

12. The tailored chromatographic media of embodiment 6, wherein the tailored chromatographic media further comprises micropores, mesopores, macropores, or combinations thereof.

13. The tailored chromatographic media of embodiment 7, wherein the macropores comprise a pore size of about 75 μm to about 1000 μm.

14. The tailored chromatographic media of embodiment 8, wherein the macropores comprise a pore size of about 100 μm to about 750 μm.

15. The tailored chromatographic media of embodiment 9, wherein the macropores comprise a pore size of about 100 μm to about 500 μm.

16. The tailored chromatographic media of embodiment 10, wherein the macropores comprise a pore size of about 100 μm to about 500 μm.

17. The tailored chromatographic media of embodiment 11, wherein the macropores comprise a pore size of about 100 μm to about 500 μm.

18. The tailored chromatographic media of embodiment 12, wherein the macropores comprise a pore size of about 100 μm to about 500 μm.

19. The tailored chromatographic media of embodiment 1, wherein the tailored chromatographic media further comprises at least two distributions of macroporous pore sizes.

20. The tailored chromatographic media of embodiment 2, wherein the tailored chromatographic media further comprises at least two distributions of macroporous pore sizes.

21. The tailored chromatographic media of embodiment 3, wherein the tailored chromatographic media further comprises at least two distributions of macroporous pore sizes.

22. The tailored chromatographic media of embodiment 4, wherein the tailored chromatographic media further comprises at least two distributions of macroporous pore sizes.

23. The tailored chromatographic media of embodiment 5, wherein the tailored chromatographic media further comprises at least two distributions of macroporous pore sizes.

24. The tailored chromatographic media of embodiment 6, wherein the tailored chromatographic media further comprises at least two distributions of macroporous pore sizes.

25. The tailored chromatographic media of embodiment 7, wherein the tailored chromatographic media further comprises at least two distributions of macroporous pore sizes.

26. The tailored chromatographic media of embodiment 8, wherein the tailored chromatographic media further comprises at least two distributions of macroporous pore sizes.

27. The tailored chromatographic media of embodiment 9, wherein the tailored chromatographic media further comprises at least two distributions of macroporous pore sizes.

28. The tailored chromatographic media of embodiment 10, wherein the tailored chromatographic media further comprises at least two distributions of macroporous pore sizes.

29. The tailored chromatographic media of embodiment 11, wherein the tailored chromatographic media further comprises at least two distributions of macroporous pore sizes.

30. The tailored chromatographic media of embodiment 12, wherein the tailored chromatographic media further comprises at least two distributions of macroporous pore sizes.

31. The tailored chromatographic media of embodiment 13, wherein the tailored chromatographic media further comprises at least two distributions of macroporous pore sizes.

32. The tailored chromatographic media of embodiment 14, wherein the tailored chromatographic media further comprises at least two distributions of macroporous pore sizes.

33. The tailored chromatographic media of embodiment 15, wherein the tailored chromatographic media further comprises at least two distributions of macroporous pore sizes.

34. The tailored chromatographic media of embodiment 16, wherein the tailored chromatographic media further comprises at least two distributions of macroporous pore sizes.

35. The tailored chromatographic media of embodiment 17, wherein the tailored chromatographic media further comprises at least two distributions of macroporous pore sizes.

36. The tailored chromatographic media of embodiment 18, wherein the tailored chromatographic media further comprises at least two distributions of macroporous pore sizes.

37. The tailored chromatographic media of embodiment 19, wherein the at least two distributions of macroporous pore sizes comprise a first population having a macroporous pore size denoted x and a second population having a macroporous pore size denoted y.

38. The tailored chromatographic media of embodiment 20, wherein the at least two distributions of macroporous pore sizes comprise a first population having a macroporous pore size denoted x and a second population having a macroporous pore size denoted y.

39. The tailored chromatographic media of embodiment 21, wherein the at least two distributions of macroporous pore sizes comprise a first population having a macroporous pore size denoted x and a second population having a macroporous pore size denoted y.

40. The tailored chromatographic media of embodiment 22, wherein the at least two distributions of macroporous pore sizes comprise a first population having a macroporous pore size denoted x and a second population having a macroporous pore size denoted y.

41. The tailored chromatographic media of embodiment 23, wherein the at least two distributions of macroporous pore sizes comprise a first population having a macroporous pore size denoted x and a second population having a macroporous pore size denoted y.

42. The tailored chromatographic media of embodiment 24, wherein the at least two distributions of macroporous pore sizes comprise a first population having a macroporous pore size denoted x and a second population having a macroporous pore size denoted y.

43. The tailored chromatographic media of embodiment 25, wherein the at least two distributions of macroporous pore sizes comprise a first population having a macroporous pore size denoted x and a second population having a macroporous pore size denoted y.

44. The tailored chromatographic media of embodiment 26, wherein the at least two distributions of macroporous pore sizes comprise a first population having a macroporous pore size denoted x and a second population having a macroporous pore size denoted y.

45. The tailored chromatographic media of embodiment 27, wherein the at least two distributions of macroporous pore sizes comprise a first population having a macroporous pore size denoted x and a second population having a macroporous pore size denoted y.

46. The tailored chromatographic media of embodiment 28, wherein the at least two distributions of macroporous pore sizes comprise a first population having a macroporous pore size denoted x and a second population having a macroporous pore size denoted y.

47. The tailored chromatographic media of embodiment 29, wherein the at least two distributions of macroporous pore sizes comprise a first population having a macroporous pore size denoted x and a second population having a macroporous pore size denoted y.

48. The tailored chromatographic media of embodiment 30, wherein the at least two distributions of macroporous pore sizes comprise a first population having a macroporous pore size denoted x and a second population having a macroporous pore size denoted y.

49. The tailored chromatographic media of embodiment 31, wherein the at least two distributions of macroporous pore sizes comprise a first population having a macroporous pore size denoted x and a second population having a macroporous pore size denoted y.

50. The tailored chromatographic media of embodiment 32, wherein the at least two distributions of macroporous pore sizes comprise a first population having a macroporous pore size denoted x and a second population having a macroporous pore size denoted y.

51. The tailored chromatographic media of embodiment 33, wherein the at least two distributions of macroporous pore sizes comprise a first population having a macroporous pore size denoted x and a second population having a macroporous pore size denoted y.

52. The tailored chromatographic media of embodiment 34, wherein the at least two distributions of macroporous pore sizes comprise a first population having a macroporous pore size denoted x and a second population having a macroporous pore size denoted y.

53. The tailored chromatographic media of embodiment 35, wherein the at least two distributions of macroporous pore sizes comprise a first population having a macroporous pore size denoted x and a second population having a macroporous pore size denoted y.

54. The tailored chromatographic media of embodiment 36, wherein the at least two distributions of macroporous pore sizes comprise a first population having a macroporous pore size denoted x and a second population having a macroporous pore size denoted y.

55. The tailored chromatographic media of embodiment 37, wherein a ratio of x/y is about 1:1.

56. The tailored chromatographic media of embodiment 38, wherein a ratio of x/y is about 1:1.
57. The tailored chromatographic media of embodiment 39, wherein a ratio of x/y is about 1:1.
58. The tailored chromatographic media of embodiment 40, wherein a ratio of x/y is about 1:1.
59. The tailored chromatographic media of embodiment 41, wherein a ratio of x/y is about 1:1.
60. The tailored chromatographic media of embodiment 42, wherein a ratio of x/y is about 1:1.
61. The tailored chromatographic media of embodiment 43, wherein a ratio of x/y is about 1:1.
62. The tailored chromatographic media of embodiment 44, wherein a ratio of x/y is about 1:1.
63. The tailored chromatographic media of embodiment 45, wherein a ratio of x/y is about 1:1.
64. The tailored chromatographic media of embodiment 46, wherein a ratio of x/y is about 1:1.
65. The tailored chromatographic media of embodiment 47, wherein a ratio of x/y is about 1:1.
66. The tailored chromatographic media of embodiment 48, wherein a ratio of x/y is about 1:1.
67. The tailored chromatographic media of embodiment 49, wherein a ratio of x/y is about 1:1.
68. The tailored chromatographic media of embodiment 50, wherein a ratio of x/y is about 1:1.
69. The tailored chromatographic media of embodiment 51, wherein a ratio of x/y is about 1:1.
70. The tailored chromatographic media of embodiment 52, wherein a ratio of x/y is about 1:1.
71. The tailored chromatographic media of embodiment 53, wherein a ratio of x/y is about 1:1.
72. The tailored chromatographic media of embodiment 54, wherein a ratio of x/y is about 1:1.
73. The tailored chromatographic media of embodiment 37, wherein a ratio of x/y is about 10:1.
74. The tailored chromatographic media of embodiment 38, wherein a ratio of x/y is about 10:1.
75. The tailored chromatographic media of embodiment 39, wherein a ratio of x/y is about 10:1.
76. The tailored chromatographic media of embodiment 40, wherein a ratio of x/y is about 10:1.
77. The tailored chromatographic media of embodiment 41, wherein a ratio of x/y is about 10:1.
78. The tailored chromatographic media of embodiment 42, wherein a ratio of x/y is about 10:1.
79. The tailored chromatographic media of embodiment 43, wherein a ratio of x/y is about 10:1.
80. The tailored chromatographic media of embodiment 44, wherein a ratio of x/y is about 10:1.
81. The tailored chromatographic media of embodiment 45, wherein a ratio of x/y is about 10:1.
82. The tailored chromatographic media of embodiment 46, wherein a ratio of x/y is about 10:1.
83. The tailored chromatographic media of embodiment 47, wherein a ratio of x/y is about 10:1.
84. The tailored chromatographic media of embodiment 48, wherein a ratio of x/y is about 10:1.
85. The tailored chromatographic media of embodiment 49, wherein a ratio of x/y is about 10:1.
86. The tailored chromatographic media of embodiment 50, wherein a ratio of x/y is about 10:1.
87. The tailored chromatographic media of embodiment 51, wherein a ratio of x/y is about 10:1.
88. The tailored chromatographic media of embodiment 52, wherein a ratio of x/y is about 10:1.
89. The tailored chromatographic media of embodiment 53, wherein a ratio of x/y is about 10:1.
90. The tailored chromatographic media of embodiment 54, wherein a ratio of x/y is about 10:1.
91. The tailored chromatographic media of embodiment 37, wherein a ratio of x/y is about 20:1.
92. The tailored chromatographic media of embodiment 38, wherein a ratio of x/y is about 20:1.
93. The tailored chromatographic media of embodiment 39, wherein a ratio of x/y is about 20:1.
94. The tailored chromatographic media of embodiment 40, wherein a ratio of x/y is about 20:1.
95. The tailored chromatographic media of embodiment 41, wherein a ratio of x/y is about 20:1.
96. The tailored chromatographic media of embodiment 42, wherein a ratio of x/y is about 20:1.
97. The tailored chromatographic media of embodiment 43, wherein a ratio of x/y is about 20:1.
98. The tailored chromatographic media of embodiment 44, wherein a ratio of x/y is about 20:1.
99. The tailored chromatographic media of embodiment 45, wherein a ratio of x/y is about 20:1.
100. The tailored chromatographic media of embodiment 46, wherein a ratio of x/y is about 20:1.
101. The tailored chromatographic media of embodiment 47, wherein a ratio of x/y is about 20:1.
102. The tailored chromatographic media of embodiment 48, wherein a ratio of x/y is about 20:1.
103. The tailored chromatographic media of embodiment 49, wherein a ratio of x/y is about 20:1.
104. The tailored chromatographic media of embodiment 50, wherein a ratio of x/y is about 20:1.
105. The tailored chromatographic media of embodiment 51, wherein a ratio of x/y is about 20:1.
106. The tailored chromatographic media of embodiment 52, wherein a ratio of x/y is about 20:1.
107. The tailored chromatographic media of embodiment 53, wherein a ratio of x/y is about 20:1.
108. The tailored chromatographic media of embodiment 54, wherein a ratio of x/y is about 20:1.
109. The tailored chromatographic media of embodiment 37, wherein a ratio of x/y is about 50:1.
110. The tailored chromatographic media of embodiment 38, wherein a ratio of x/y is about 50:1.
111. The tailored chromatographic media of embodiment 39, wherein a ratio of x/y is about 50:1.
112. The tailored chromatographic media of embodiment 40, wherein a ratio of x/y is about 50:1.
113. The tailored chromatographic media of embodiment 41, wherein a ratio of x/y is about 50:1.
114. The tailored chromatographic media of embodiment 42, wherein a ratio of x/y is about 50:1.
115. The tailored chromatographic media of embodiment 43, wherein a ratio of x/y is about 50:1.
116. The tailored chromatographic media of embodiment 44, wherein a ratio of x/y is about 50:1.
117. The tailored chromatographic media of embodiment 45, wherein a ratio of x/y is about 50:1.
118. The tailored chromatographic media of embodiment 46, wherein a ratio of x/y is about 50:1.
119. The tailored chromatographic media of embodiment 47, wherein a ratio of x/y is about 50:1.
120. The tailored chromatographic media of embodiment 48, wherein a ratio of x/y is about 50:1.
121. The tailored chromatographic media of embodiment 49, wherein a ratio of x/y is about 50:1.

122. The tailored chromatographic media of embodiment 50, wherein a ratio of x/y is about 50:1.

123. The tailored chromatographic media of embodiment 51, wherein a ratio of x/y is about 50:1.

124. The tailored chromatographic media of embodiment 52, wherein a ratio of x/y is about 50:1.

125. The tailored chromatographic media of embodiment 53, wherein a ratio of x/y is about 50:1.

126. The tailored chromatographic media of embodiment 54, wherein a ratio of x/y is about 50:1.

127. The tailored chromatographic media of embodiment 37, wherein a ratio of x/y is about 100:1.

128. The tailored chromatographic media of embodiment 38, wherein a ratio of x/y is about 100:1.

129. The tailored chromatographic media of embodiment 39, wherein a ratio of x/y is about 100:1.

130. The tailored chromatographic media of embodiment 40, wherein a ratio of x/y is about 100:1.

131. The tailored chromatographic media of embodiment 41, wherein a ratio of x/y is about 100:1.

132. The tailored chromatographic media of embodiment 42, wherein a ratio of x/y is about 100:1.

133. The tailored chromatographic media of embodiment 43, wherein a ratio of x/y is about 100:1.

134. The tailored chromatographic media of embodiment 44, wherein a ratio of x/y is about 100:1.

135. The tailored chromatographic media of embodiment 45, wherein a ratio of x/y is about 100:1.

136. The tailored chromatographic media of embodiment 46, wherein a ratio of x/y is about 100:1.

137. The tailored chromatographic media of embodiment 47, wherein a ratio of x/y is about 100:1.

138. The tailored chromatographic media of embodiment 48, wherein a ratio of x/y is about 100:1.

139. The tailored chromatographic media of embodiment 49, wherein a ratio of x/y is about 100:1.

140. The tailored chromatographic media of embodiment 50, wherein a ratio of x/y is about 100:1.

141. The tailored chromatographic media of embodiment 51, wherein a ratio of x/y is about 100:1.

142. The tailored chromatographic media of embodiment 52, wherein a ratio of x/y is about 100:1.

143. The tailored chromatographic media of embodiment 53, wherein a ratio of x/y is about 100:1.

144. The tailored chromatographic media of embodiment 54, wherein a ratio of x/y is about 100:1.

145. The tailored chromatographic media of embodiment 1, wherein the tailored chromatographic media further comprises a mixture of two populations wherein the pore size of the first population is approximately twice the pore size of the second population.

146. The tailored chromatographic media of embodiment 2, wherein the tailored chromatographic media further comprises a mixture of two populations wherein the pore size of the first population is approximately twice the pore size of the second population.

147. The tailored chromatographic media of embodiment 3, wherein the tailored chromatographic media further comprises a mixture of two populations wherein the pore size of the first population is approximately twice the pore size of the second population.

148. The tailored chromatographic media of embodiment 1, wherein the tailored chromatographic media further comprises a mixture of three populations where the pore size of a first population is approximately twice the pore size of the second population and the pore size of the third population is approximately two and a half times the pore size of the second population.

149. The tailored chromatographic media of embodiment 2, wherein the tailored chromatographic media further comprises a mixture of three populations where the pore size of a first population is approximately twice the pore size of the second population and the pore size of the third population is approximately two and a half times the pore size of the second population.

150. The tailored chromatographic media of embodiment 3, wherein the tailored chromatographic media further comprises a mixture of three populations where the pore size of a first population is approximately twice the pore size of the second population and the pore size of the third population is approximately two and a half times the pore size of the second population.

151. A method comprising using the tailored chromatographic media of any one of embodiments 1 through 150 as a stationary phase in a chromatography process.

152. A method comprising using the tailored chromatographic media of any one of embodiments 1 through 150 as a stationary phase in a normal phase chromatography process.

153. A method comprising using the tailored chromatographic media of any one of embodiments 1 through 150 as a stationary phase in a reverse phase chromatography process.

154. A method comprising using the tailored chromatographic media of any one of embodiments 1 through 150 as a stationary phase in a reverse phase flash chromatography process.

155. A method of comprising subjecting a mixture extracted from cannabis to chromatography using the tailored chromatographic media of embodiment 151 to obtain a single cannabinoid having greater than about 90% purity.

156. A method of comprising subjecting a mixture extracted from cannabis to chromatography using the tailored chromatographic media of embodiment 151 to obtain a single cannabinoid having greater than about 95% purity.

157. A method of comprising subjecting a mixture extracted from cannabis to chromatography using the tailored chromatographic media of embodiment 151 to obtain a single cannabinoid having greater than about 99% purity.

158. A method of comprising subjecting a mixture extracted from cannabis to chromatography using the tailored chromatographic media of embodiment 151 to obtain a single cannabinoid having greater than about 99.5% purity.

159. A method of comprising subjecting a mixture extracted from cannabis to chromatography using the tailored chromatographic media of embodiment 152 to obtain a single cannabinoid having greater than about 90% purity.

160. A method of comprising subjecting a mixture extracted from cannabis to chromatography using the tailored chromatographic media of embodiment 152 to obtain a single cannabinoid having greater than about 95% purity.

161. A method of comprising subjecting a mixture extracted from cannabis to chromatography using the tailored chromatographic media of embodiment 152 to obtain a single cannabinoid having greater than about 99% purity.

162. A method of comprising subjecting a mixture extracted from cannabis to chromatography using the tailored chromatographic media of embodiment 152 to obtain a single cannabinoid having greater than about 99.5% purity.

163. A method of comprising subjecting a mixture extracted from cannabis to chromatography using the tailored chromatographic media of embodiment 153 to obtain a single cannabinoid having greater than about 90% purity.

164. A method of comprising subjecting a mixture extracted from cannabis to chromatography using the tailored chromatographic media of embodiment 153 to obtain a single cannabinoid having greater than about 95% purity.

165. A method of comprising subjecting a mixture extracted from cannabis to chromatography using the tailored chromatographic media of embodiment 153 to obtain a single cannabinoid having greater than about 99% purity.

166. A method of comprising subjecting a mixture extracted from cannabis to chromatography using the tailored chromatographic media of embodiment 153 to obtain a single cannabinoid having greater than about 99.5% purity.

167. A method of comprising subjecting a mixture extracted from cannabis to chromatography using the tailored chromatographic media of embodiment 154 to obtain a single cannabinoid having greater than about 90% purity.

168. A method of comprising subjecting a mixture extracted from cannabis to chromatography using the tailored chromatographic media of embodiment 154 to obtain a single cannabinoid having greater than about 95% purity.

169. A method of comprising subjecting a mixture extracted from cannabis to chromatography using the tailored chromatographic media of embodiment 154 to obtain a single cannabinoid having greater than about 99% purity.

170. A method of comprising subjecting a mixture extracted from cannabis to chromatography using the tailored chromatographic media of embodiment 154 to obtain a single cannabinoid having greater than about 99.5% purity.

171. The method of embodiment 155, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD, cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

172. The method of embodiment 156, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD, cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

173. The method of embodiment 157, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD, cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

174. The method of embodiment 158, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD), cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

175. The method of embodiment 159, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD), cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

176. The method of embodiment 160, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD), cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

177. The method of embodiment 161, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD), cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

178. The method of embodiment 162, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD, cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

179. The method of embodiment 163, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD, cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

180. The method of embodiment 164, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD, cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

181. The method of embodiment 165, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD, cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

182. The method of embodiment 166, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD, cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

183. The method of embodiment 167, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD, cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

184. The method of embodiment 168, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD, cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

185. The method of embodiment 169, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD, cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

186. The method of embodiment 170, wherein the cannabinoid is selected from the group consisting of cannabichromene (CBC), cannabichromenic acid (CBCA), cannabichromevarin (CBCV), cannabichromevarinic acid (CBCVA), cannabicyclol (CBL), cannabicyclolic acid (CBLA), cannabicyclovarin (CBLV), cannabidiol (CBD, cannabidiol monomethylether (CBDM), cannabidiolic acid (CBDA), cannabidiorcol (CBD-C1), cannabidivarin (CBDV), cannabidivarinic acid (CBDVA), cannabielsoic acid B (CBEA-B), cannabielsoin (CBE), cannabielsoin acid A (CBEA-A), cannabigerol (CBG), cannabigerol monomethylether (CBGM), cannabigerolic acid (CBGA), cannabigerolic acid monomethylether (CBGAM), cannabigerovarin (CBGV), cannabigerovarinic acid (CBGVA), cannabinodiol (CBND), cannabinodivarin (CBVD), cannabinol (CBN), cannabinol methylether (CBNM), cannabinol-C2 (CBN-C2), cannabinol-C4 (CBN-C4), cannabinolic acid (CBNA), cannabiorcool (CBN-C1), cannabivarin (CBV), 10-ethoxy-9-hydroxy-delta-6a-tetrahydrocannabinol, 8,9-Dihydroxy-delta-6a-tetrahydrocannabinol, cannabitriol (CBT), cannabitriolvarin (CBTV), delta-8-tetrahydrocannabinol (Δ8-THC), delta-8-tetrahydrocannabinolic acid (Δ8-THCA), delta-9-tetrahydrocannabinol (THC), delta-9-tetrahydrocannabinol-C4 (THC-C4), delta-9-tetrahydrocannabinolic acid A (THCA-A), delta-9-tetrahydrocannabinolic acid B (THCA-B), delta-9-tetrahydrocannabinolic acid-C4 (THCA-C4), delta-9-tetrahydrocannabiorcol (THC-C1), delta-9-tetrahydrocannabiorcolic acid (THCA-C1), delta-9-tetrahydrocannabivarin (THCV), delta-9-tetrahydrocannabivarinic acid (THCVA), 10-Oxo-delta-6a-tetrahydrocannabinol (OTHC), cannabichromanon (CBCF), cannabifuran (CBF), cannabiglendol, cannabiripsol (CBR), cannbicitran (CBT), dehydrocannabifuran (DCBF), delta-9-cis-tetrahydrocannabinol (cis-THC), trihydroxy-delta-9-tetrahydrocannabinol (triOH-THC) and 3,4,5,6-Tetrahydro-7-hydroxy-alpha-alpha-2-trimethyl-9-n-propyl-2,6-methano-2H-1-benzoxocin-5-methanol.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. The present examples are to be considered as illustrative and not restrictive, and the intention is not to be limited to the details given herein. For example, the various elements or components may be combined or integrated in another system or certain features may be omitted or not implemented. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A chromatographic media comprising:
   a porous carbon having a surface area of greater than about 900 m$^2$/g;
   beads, wherein the beads comprise macropores comprising a pore size of about 75 nm to about 1000 mm;
   at least two distributions of macroporous ore sizes size ranges and wherein the at east two distributions of macroporous pore sizes size ranges comprise a first population having a macroporous pore size range denoted x and a second population baying a macroporous pore size range denoted y, wherein a ratio of x/y is about 20:1.

2. The chromatographic media of claim 1, wherein the chromatographic media further comprises a mixture of two populations wherein an average pore size of a first population is approximately twice an average pore size of a second population.

3. The chromatographic media of claim 1, wherein the chromatographic media further comprises a mixture of three populations where an average pore size of a first population is approximately twice an average pore size of a second population and an average pore size of a third population is approximately two and a half times the average pore size of the second population.

* * * * *